United States Patent
Brunn et al.

(10) Patent No.: US 11,861,463 B2
(45) Date of Patent: *Jan. 2, 2024

(54) IDENTIFYING RELATED MESSAGES IN A NATURAL LANGUAGE INTERACTION

(71) Applicant: International Business Machines Corporation, Armonk, NY (US)

(72) Inventors: Jonathan F. Brunn, Logan, UT (US); Rachael Marie Huston Dickens, Raleigh, NC (US); Rui Zhang, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 862 days.

This patent is subject to a terminal disclaimer.

(21) Appl. No.: 16/563,158

(22) Filed: Sep. 6, 2019

(65) Prior Publication Data

US 2021/0073670 A1 Mar. 11, 2021

(51) Int. Cl.
*G06F 16/35* (2019.01)
*G06N 20/00* (2019.01)
*G06N 5/02* (2023.01)

(52) U.S. Cl.
CPC .......... *G06N 20/00* (2019.01); *G06F 16/353* (2019.01); *G06N 5/02* (2013.01)

(58) Field of Classification Search
CPC ......... G06N 20/00; G06N 5/02; G06F 16/353
USPC ............... 707/706, 737, 738; 706/12, 13, 14
See application file for complete search history.

(56) References Cited

U.S. PATENT DOCUMENTS

| | | | |
|---|---|---|---|
| 5,905,863 A | 5/1999 | Knowles et al. | |
| 8,479,285 B2* | 7/2013 | Moyle | G06F 21/55 |
| | | | 726/13 |
| 9,143,468 B1 | 9/2015 | Cohen et al. | |
| 10,366,168 B2* | 7/2019 | Wu | G06F 40/30 |
| 11,288,321 B1* | 3/2022 | Rose | G06F 3/0482 |
| 2003/0212746 A1 | 11/2003 | Fitzpatrick et al. | |
| 2006/0080162 A1* | 4/2006 | Arnett | H04L 51/216 |
| | | | 705/7.31 |
| 2006/0271630 A1 | 11/2006 | Bensky et al. | |
| 2007/0282956 A1 | 12/2007 | Staats | |

(Continued)

OTHER PUBLICATIONS

Wang et al., "Email Conversations Reconstruction Based on Messages Threading for Multi-person," 2008 International Workshop on Education Technology and Training & 2008 International Workshop on Geoscience and Remote Sensing, Shanghai, 2008, pp. 676-680.

(Continued)

*Primary Examiner* — Cam Linh T Nguyen
(74) *Attorney, Agent, or Firm* — Garg Law Firm, PLLC; Rakesh Garg; Jordan Schiller

(57) ABSTRACT

Using a natural language analysis, a current message is classified into a current message class, the current message being a portion of an interaction in narrative text form. Using a trained message class prediction model, a probability of a previous message class having resulted in the current message class is determined. A previous message is extracted from the interaction using the probability, the previous message being a portion of the interaction occurring prior to the current message, the previous message being classified into the previous message class.

20 Claims, 9 Drawing Sheets

(56) References Cited

U.S. PATENT DOCUMENTS

| | | | |
|---|---|---|---|
| 2009/0234924 A1 | 9/2009 | Edelen et al. | |
| 2012/0185797 A1 | 7/2012 | Thorsen et al. | |
| 2014/0211665 A1* | 7/2014 | Voccio | H04L 12/1403 370/259 |
| 2014/0215443 A1* | 7/2014 | Voccio | G06F 16/245 717/128 |
| 2014/0280235 A1 | 9/2014 | Lacage et al. | |
| 2014/0310714 A1* | 10/2014 | Chan | G06F 16/285 718/102 |
| 2016/0291840 A1* | 10/2016 | Patil | G06F 3/0482 |
| 2017/0034087 A1* | 2/2017 | Borenstein | H04L 51/08 |
| 2019/0364001 A1* | 11/2019 | Dotan-Cohen | G06Q 10/107 |
| 2020/0084055 A1* | 3/2020 | Brunn | H04L 51/046 |
| 2020/0142999 A1* | 5/2020 | Pedersen | G06K 9/6263 |
| 2020/0334420 A1* | 10/2020 | Sarikaya | G06F 40/40 |
| 2021/0042586 A1* | 2/2021 | Toyoshiba | G06F 17/18 |
| 2021/0073670 A1* | 3/2021 | Brunn | G06N 5/02 |

OTHER PUBLICATIONS

List of IBM's related applications, Appendix P, 2019.

\* cited by examiner

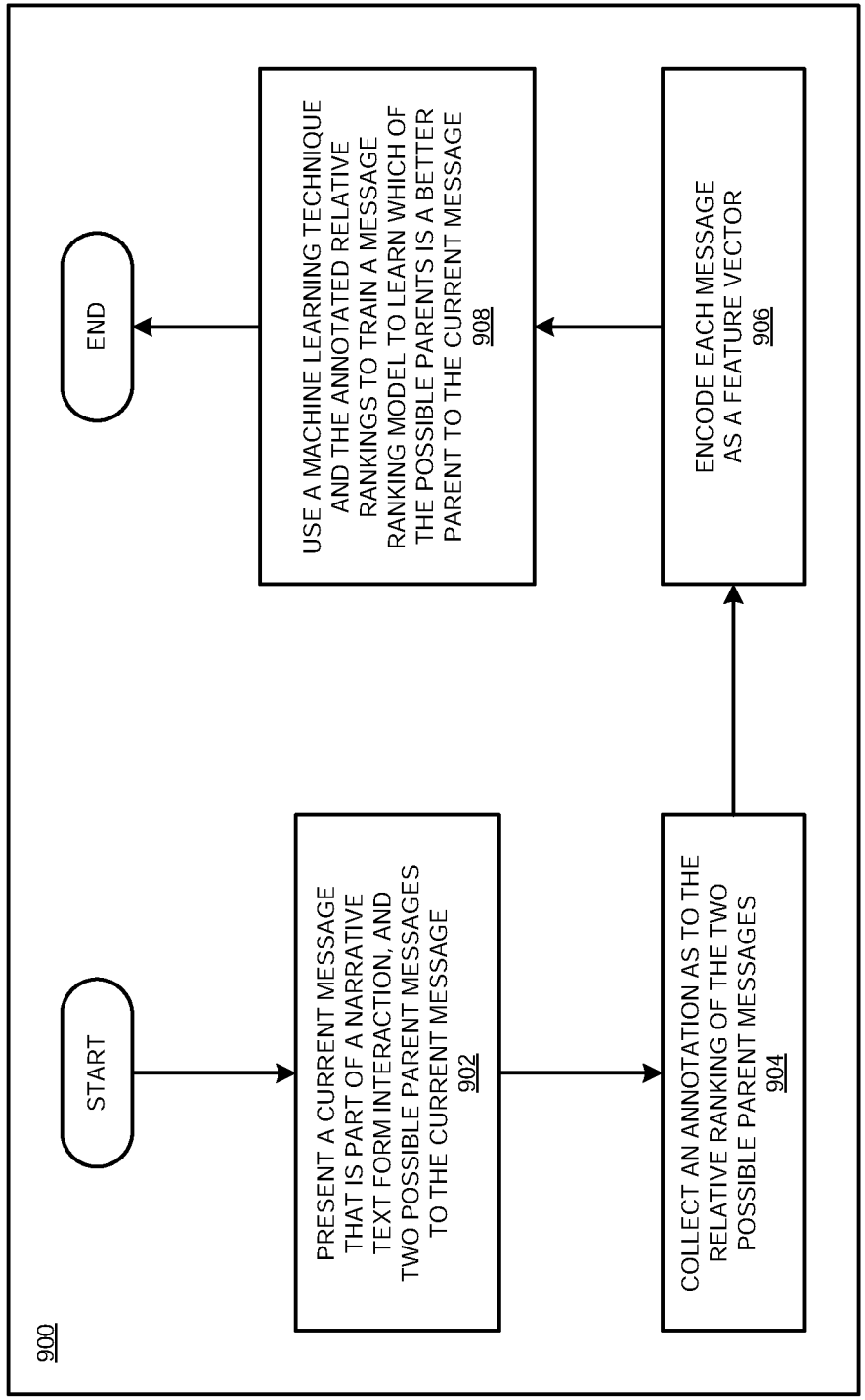

IDENTIFYING RELATED MESSAGES IN A NATURAL LANGUAGE INTERACTION

TECHNICAL FIELD

The present invention relates generally to a method, system, and computer program product for extracting information from a natural language interaction. More particularly, the present invention relates to a method, system, and computer program product for identifying related messages in a natural language interaction.

BACKGROUND

A natural language is a scripted (written) or a vocalized (spoken) language having a form that is employed by humans for primarily communicating with other humans or with systems having a natural language interface. Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content. Another branch of NLP pertains to cognitive analytics, the process of analyzing available information or knowledge to create, infer, deduce, or derive new information.

Conversation-based collaboration tools are becoming common. A conversation-based collaboration tool is software that allows a member of a group of users to send messages to one or more members of the group, forming a natural language conversation or chat. Teams, especially when not all team members work in the same location, typically use a collaboration tool for rapid, informal, electronic interactions, much like those that could take place if the entire team worked in one room. Typically, the natural language conversation is conducted in text form. However, input to the conversation can also be converted from another modality, such as speech, into text for processing and transmission to other participants, then contributions to the conversation from other participants converted back into speech a human can hear.

A message is a unit of conversation. A message is a portion of narrative text, or another form of narrative communication converted into narrative text, communicated from a user to one or more users. A message need not conform to a grammar, but may also be any natural language word or phrase. A message can also include a collaborative action, such as sharing a file or a reference to a website. An interaction is a group of messages.

SUMMARY

The illustrative embodiments provide a method, system, and computer program product. An embodiment includes a method that classifies, using a natural language analysis, a current message into a current message class, the current message being a portion of an interaction in narrative text form. An embodiment determines, using a trained message class prediction model, a probability of a previous message class having resulted in the current message class. An embodiment extracts, from the interaction using the probability, a previous message, the previous message being a portion of the interaction occurring prior to the current message, the previous message being classified into the previous message class.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 9 depicts a flowchart of an example process for identifying related messages in a natural language interaction in accordance with an illustrative embodiment.

DETAILED DESCRIPTION

Figure 1:
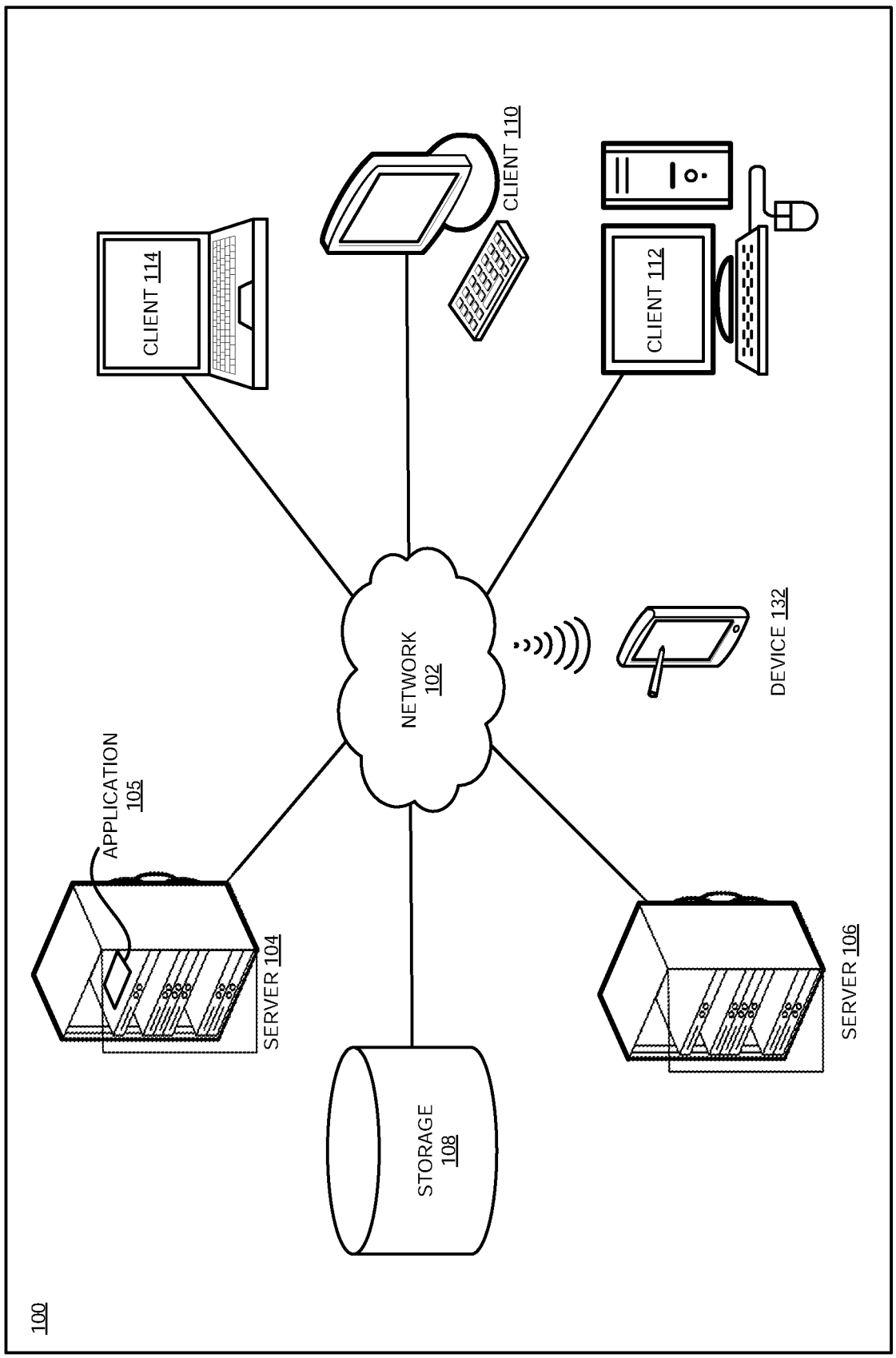
FIG. 1 depicts a block diagram of a network of data processing systems in which illustrative embodiments may be implemented.

The illustrative embodiments recognize that, while conversation-based collaboration tools provide an easy, natural way of communicating, the result is an undifferentiated flow of messages. An interaction, especially among more than two users, can include many threads, each proceeding on its own timeline and including numerous messages. When a user generates a new message in an interaction, it can be difficult to identify to which previous message (or action) is being addressed, or if the new message has no previous message (i.e. is the start of a new thread). Just as in face-to-face interactions, an interaction about one topic may segue into another topic, or the two topics may become intermingled, even if a tool attempts to divide interactions by topic area. Participants may implicitly refer to subject matter discussed previously or answer questions asked several messages back in the interaction. Identifying the preceding message can help track and visualize conversational workflows, reduce user confusion, and increase team productivity. Prior-art applications allow messages to be marked or created as in reply to another message, creating user defined threads that clarify a relationship between messages, but this is a manual process that is commonly skipped in a rapid, informal interaction.

The illustrative embodiments also recognize that the messages exchanged in conversation-based collaboration tools can include information on tasks to perform, commitments to perform a task, appointments, and other project or time management items participants often track in a separate project or time management tool. Such task, appointments, and other project or time management items are collectively referred to herein as commitments. For example, one conversation participant might ask for a status report by Friday, and another conversation participant might agree to provide one, but only by Monday. However, because of the number of messages in a conversation, the intermingled nature of topics in a conversation, and the rapidity and informality of the conversation, it might be difficult for the second participant to record in a to-do list that she will provide this status report by Monday. In addition, a follow-up to a commitment may come sufficiently later in an interaction and sufficiently removed from the original commitment's context that it can be difficult for a human user to associate the follow-up with the original commitment. Although prior-art applications allow users to mark messages as actions or decisions manually and search, filter or sort by those labels, this marking is also performed manually.

The illustrative embodiments also recognize that requiring users to perform manual steps to indicate a specific message being replied to, define threads, or manually record commitments is cumbersome, time consuming, and undermines the benefits of the rapid, informal interaction collaboration tools provide. Thus, the illustrative embodiments recognize that there is an unmet need to automatically identify messages that are related to each other, for use in automatically extracting data within those messages to form commitments.

The illustrative embodiments recognize that the presently available tools or solutions do not address these needs or provide adequate solutions for these needs. The illustrative embodiments used to describe the invention generally address and solve the above-described problems and other problems related to identifying related messages in a natural language interaction.

An embodiment can be implemented as a software application. The application implementing an embodiment can be configured as a modification of an existing conversation-based collaboration system, as a separate application that operates in conjunction with an existing conversation-based collaboration system, a standalone application, or some combination thereof.

Particularly, some illustrative embodiments provide a method of determining, using a trained message predictor model, a probability of a previous message in an interaction having resulted in a current message, and extracting the previous message from the interaction. Once a previous message has been determined, an embodiment performs other tasks associated with the now-identified message thread, such as presenting the thread to a user in threaded form or assembling information within the thread into a commitment in a project or time management tool.

An embodiment classifies a message, or a portion of a message into a message class. To classify the message, an embodiment uses any suitable natural language analysis classification technique. A message can be classified into more than one class.

One embodiment uses a set of classification modules, each configured to identify a particular natural language feature or pattern. For example, one classification module identifies messages in which someone appears to be looking for an expert, and messages including a query to which the answer is likely to be a person's name. Another example classification module identifies an action within a message, and a commitment in another message. Another example classification module identifies meetings and meeting-related information, such as the meeting subject, time, or place. Another example classification module identifies messages that are confirmations or negations. A simpler example classification module identifies messages that include an account number, or a stock ticker symbol. In one classification module implementation, each module performs its own classification independently of the other modules. Thus, for example, the account number and stock ticker symbol modules could independently classify a message (for example, one including a customer's account number and an order to sell 500 shares of a particular stock and place the proceeds in the referenced account) as including both an account number and a stock ticker symbol. In another classification module implementation, a module has the ability to consult prior classifications of other messages, or other classifications of a current message, in determining a classification.

Classifying messages aids an embodiment in determining conversational patterns that can be used to predict which messages will follow which other messages. For example, a message asking for an expert is often followed by others suggesting names of experts, or saying they do not know the right expert. As another example, a request for a meeting is often followed by a series of messages involving the time and place of the meeting.

An embodiment models conversational patterns using a Markov inference model. Message classes are represented by nodes in the Markov model. In probability theory, a conditional probability is a measure of the probability of an event occurring given that another event has occurred. Thus, using the Markov model, if a message is in class 1, denoted by $C_1$, there is a conditional probability $P(C_2|C_1)$ (i.e., the probability of $C_2$ given $C_1$) that this message in $C_1$ will be followed by a message in class 2, denoted by $C_2$. In the model, a single class need not lead to only one other class. Instead, multiple classes may lead to one class, and one class may lead to multiple classes.

An embodiment trains the model using pairs of messages. In one training set implementation, when a new message arrives at an embodiment for analysis, the embodiment asks a user to identify a parent message of the new message, where a parent message is a previous message related to the new message. For example, if a new message is, "Let's meet at six," a parent message might be, "What time should we meet?" Conversely, a child message is a successor of a parent message. Thus, a new message can be a child of a parent message. In another training set implementation, instead of asking a user to identify a parent message when a later message is received, a message classifier can be configured to identify a parent message class as part of new message classification. In another training set implementation, instead of asking a user to identify a parent message when a later message is received, an entire interaction is formed into a thread and parent and child messages identified using any suitable technique.

An embodiment classifies both the new (or child) and parent messages into one or more message classes, in a manner described herein. A class of the new message is denoted by $C_m$, and a class of the parent message is denoted by $C_p$. Then an embodiment trains the model by updating the conditional probability $P(C_m|C_p)$ with the expression (number of previous instances of $C_p$ preceding $C_m$)/(number of previous $C_p$ instances), where an instance refers to an occurrence of $C_p$ or $C_m$ within interactions the model has processed. In addition, because the number of $C_p$ instances is incremented each time a new message having $C_p$ as the class of the parent message is processed, all conditional probabilities using $C_p$ require corresponding updates.

An embodiment uses the trained model as a message class prediction model to determine a probability of a previous message class having resulted in a current message class. In mathematical notation, a probability of a previous message class having resulted in a current message class is the conditional probability $P(C_p|C_m)$, where a class of a message currently being analyzed is denoted by $C_m$, and a class of a parent message is denoted by $C_p$. An embodiment reverses the conditional probability $P(C_m|C_p)$ with which the model was trained and determines the conditional probability $P(C_pC_m)$ using any suitable mathematical technique.

Another embodiment uses a different model as a message class prediction model. This different model can be trained, if required, using any training method suitable to the model used.

Once an embodiment has determined a probability of a previous message class having resulted in a current message class, an embodiment uses that probability to extract one or more previous messages from the interaction. In one embodiment, for every message class probability above a threshold probability level, the embodiment extracts the corresponding message from the interaction and presents the messages to a user. This set of extracted messages are all likely to be a parent of the current message. Another embodiment selects at most a predetermined number of the highest message class probabilities and, for each selected probability, extracts the corresponding message from the interaction and presents the messages to a user. Another embodiment selects at most a predetermined number of the message class probabilities corresponding to the most recent messages and, for each selected probability, extracts the corresponding message from the interaction and presents the messages to a user. When presenting the messages to a user, one embodiment sorts the messages according to the corresponding message class probabilities, and another embodiment sorts the messages according to their recency. Other selection methods of which messages to present and the order in which they are presented are also possible and contemplated within the scope of the illustrative embodiments. An embodiment allows a user to select one or more of the presented messages as actual parent messages.

If there are too many candidate parent messages to present to a user for selection, or to implement an automatic selection process, an embodiment uses a trained message ranking model to reduce the size of the presented message set or select one parent message.

To use the message ranking model, an embodiment encodes as a numerical representation, or vector, each candidate parent message to be ranked. Each dimension of the vector corresponds to a different feature of a message. For example, one set of features includes a known entity mentioned in a message, a proximity of the message sender, reader, and mentioned entity in a social graph, a message's recency, coincidence of terms relative to previously processed narrative text, features of the message for which candidate parents are being ranked, and vector space comparison of sentence embedding, each using a 0-1 scale. A sentence embedding is a vector representing a subset of an entire message. A sentence embedding can represent an entire grammatical sentence, but can also represent another subset of a message. Other sets of features, and other encoding schemes, are also possible and contemplated within the scope of the illustrative embodiments. Encoding messages as vectors allows the model to process numbers rather than the natural language text directly.

During training, the message ranking model learns a pairwise mapping for the relative ranking of two candidate parent messages for a current message, where each message is encoded into a vector in a manner described herein. In other words, for a given candidate message, a model output of 0 indicates that one of the candidate parents is a better parent message and a model output of 1 indicates that the other candidate parent is a better parent message. An embodiment trains the message ranking model to learn the pairwise mapping using any suitable machine learning technique. Some suitable techniques use linear models such as logistic regressions, or more expensive models such as a multi-layer neural network.

An embodiment uses the trained message ranking model to rank a set of candidate parent messages given a current message. In particular, the embodiment encodes each message into a vector in a manner described herein, then applies pairs of candidate parent messages to the trained model for relative ranking using any suitable technique. Algorithms for ranking a set of objects using pairs of relative rankings are known. When the set of candidate parent messages has been ranked, an embodiment designates the highest ranking candidate parent message as the actual parent message.

Once an embodiment has identified a parent-child relationship between messages, an embodiment assembles the related messages into a message thread according to the parent-child relationship. The message thread can also include additional messages, such as a parent message to a parent message already in the thread, or a child message to a child message already in the thread. In addition, a parent message can have multiple child messages, and a child message can have multiple parent messages within a thread. Assembling messages into a thread, without intervening messages that are irrelevant to the thread, allows a user to focus on one thread at a time.

Once an embodiment has identified a parent-child relationship between messages, if information in the messages includes data relating to a commitment, an embodiment assembles the information into a commitment. The commitment can also include information from additional messages, such as a parent message to an already-identified parent message, or a child message to an already-identified child message. For example, if a parent message suggests a meeting and a child message specifies a time for the meeting, an embodiment assembles the information in the messages into a calendar item for the meeting at the specified time.

The manner of identifying related messages in a natural language interaction described herein is unavailable in the presently available methods in the technological field of endeavor pertaining to natural language analysis. A method of an embodiment described herein, when implemented to execute on a device or data processing system, comprises substantial advancement of the functionality of that device or data processing system in determining, using a trained message predictor model, a probability of a previous message in an interaction having resulted in a current message, and extracting the previous message from the interaction.

The illustrative embodiments are described with respect to certain types of messages, interactions, encodings, models, probabilities, threads, commitments, rankings, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
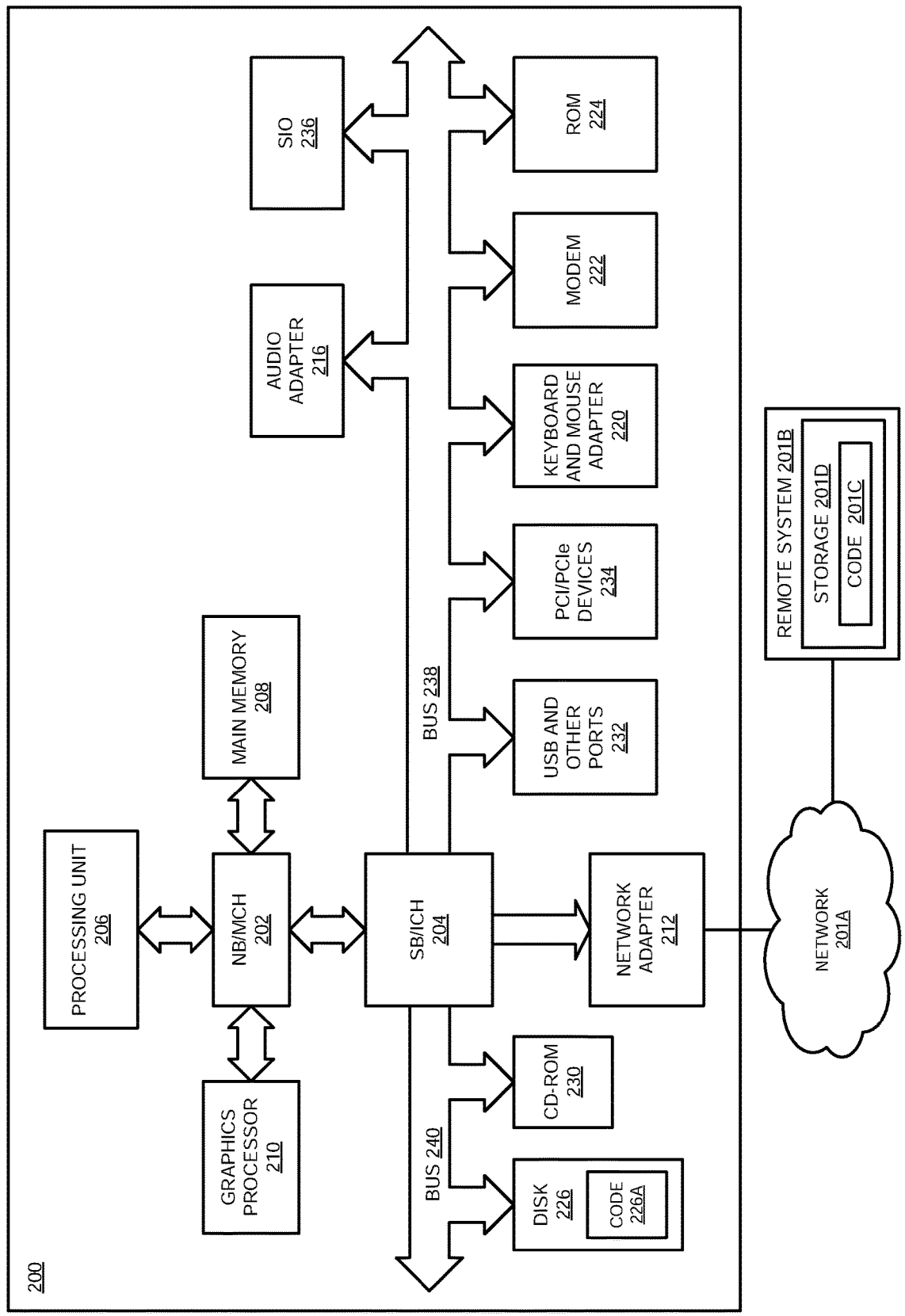
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
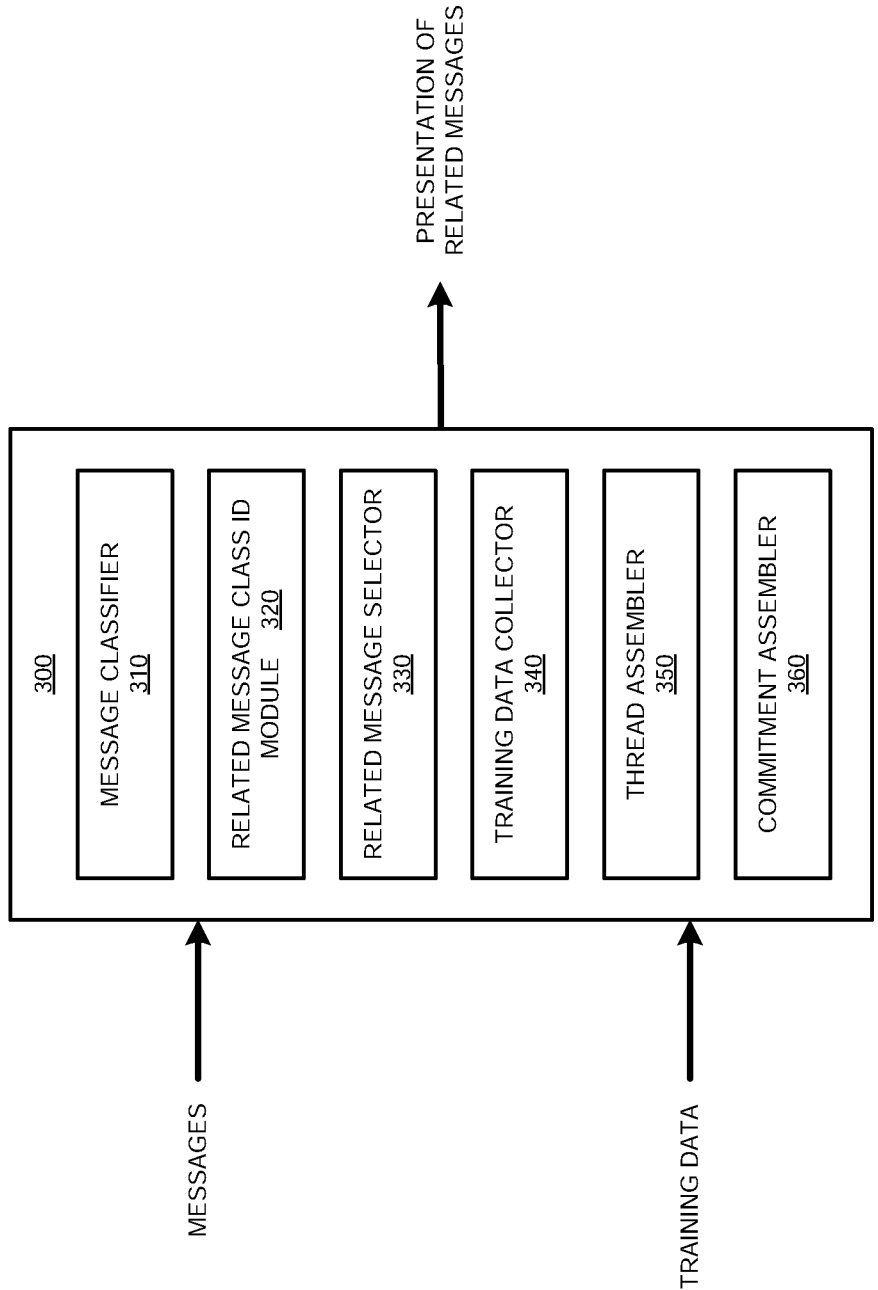
FIG. 3 depicts a block diagram of an example configuration for identifying related messages in a natural language interaction in accordance with an illustrative embodiment.

With reference to FIG. 3, this figure depicts a block diagram of an example configuration for identifying related messages in a natural language interaction in accordance with an illustrative embodiment. Application 300 is an example of application 105 in FIG. 1 and executes in any of servers 104 and 106, clients 110, 112, and 114, and device 132 in FIG. 1.

Message classifier 310 classifies a message, or a portion of a message into a message class. To classify the message, module 310 uses any suitable natural language analysis classification technique. A message can be classified into more than one class.

One implementation of module 310 uses a set of classification modules, each configured to identify a particular natural language feature or pattern. For example, one classification module identifies messages in which someone appears to be looking for an expert, and messages including a query to which the answer is likely to be a person's name. Another example classification module identifies an action within a message, and a commitment in another message. Another example classification module identifies meetings and meeting-related information, such as the meeting subject, time, or place. Another example classification module identifies messages that are confirmations or negations. A simpler example classification module identifies messages that include an account number, or a stock ticker symbol. In a classification module implementation, each module performs its own classification independently of the other modules.

Related message class identification module 320 models conversational patterns. In particular, module 320 trains the model using pairs of messages. In one training set implementation, when a new message arrives at an embodiment for analysis, training data collector 340 asks a user to identify a parent message of the new message. In another training set implementation, instead of asking a user to identify a parent message when a later message is received, an entire interaction is formed into a thread and parent and child messages identified using any suitable technique. Module 310 classifies both the new (or child) and parent messages into one or more message classes, in a manner described herein. A class of the new message is denoted by $C_m$, and a class of the parent message is denoted by $C_p$. Then module 320 trains the model by updating the conditional probability $P(C_m|C_p)$ with the expression (number of previous instances of $C_p$ preceding $C_m$)/(number of previous $C_p$ instances).

Module 320 uses the trained model as a trained message class prediction model to determine a probability of a previous message class having resulted in a current message class. In particular, module 320 reverses the conditional probability $P(C_m|C_p)$ with which the model was trained and determines the conditional probability $P(C_p|C_m)$ using any suitable mathematical technique.

Once module 320 has determined a probability of a previous message class having resulted in a current message class, related message selector 330 uses that probability to extract one or more previous messages from the interaction. Module 330 can be configured to extract, for every message class probability above a threshold probability level, the corresponding message from the interaction. Module 330 can also be configured to select at most a predetermined number of the highest message class probabilities and, for each selected probability, extract the corresponding message from the interaction. Module 330 can also be configured to select at most a predetermined number of the message class probabilities corresponding to the most recent messages and, for each selected probability, extract the corresponding message from the interaction. Once a set of candidate parent message has been selected, module 330 presents the set to a user, sorted according to the corresponding message class probabilities or messages according to the messages' recency.

If there are too many candidate parent messages to present to a user for selection, or to implement an automatic selection process, module 330 uses a trained message ranking model to reduce the size of the presented message set or select one parent message.

To use the message ranking model, module 330 encodes each message as a numerical representation, or vector. Each dimension of the vector corresponds to a different feature of the message. During training, the message ranking model learns a pairwise mapping for the relative ranking of two candidate parent messages for a current message, where each message is encoded into a vector in a manner described herein. In other words, for a given candidate message, a model output of 0 indicates that one of the candidate parents is a better parent message and a model output of 1 indicates that the other candidate parent is a better parent message. The message ranking model can be trained to learn the pairwise mapping using any suitable, machine learning technique.

Module 330 uses the trained message ranking model to rank a set of candidate parent messages given a current message. In particular, module 330 encodes each message into a vector in a manner described herein, then applies pairs of candidate parent messages to the trained model for relative ranking using any suitable technique. Algorithms for ranking a set of objects using pairs of relative rankings are known. When the set of candidate parent messages has been ranked, module 330 designates the highest ranking candidate parent message as the actual parent message.

Once module 330 has identified a parent-child relationship between messages, thread assembler 350 assembles the related messages into a message thread according to the parent-child relationship. The message thread can also include additional messages, such as a parent message to a parent message already in the thread, or a child message to a child message already in the thread. In addition, a parent message can have multiple child messages, and a child message can have multiple parent messages within a thread.

Assembling messages into a thread, without intervening messages that are irrelevant to the thread, allows a user to focus on one thread at a time.

Once module 330 has identified a parent-child relationship between messages, if information in the messages includes data relating to a commitment, commitment assembler 360 assembles the information into a commitment. The commitment can also include information from additional messages, such as a parent message to an already-identified parent message, or a child message to an already-identified child message.

Figure 4:
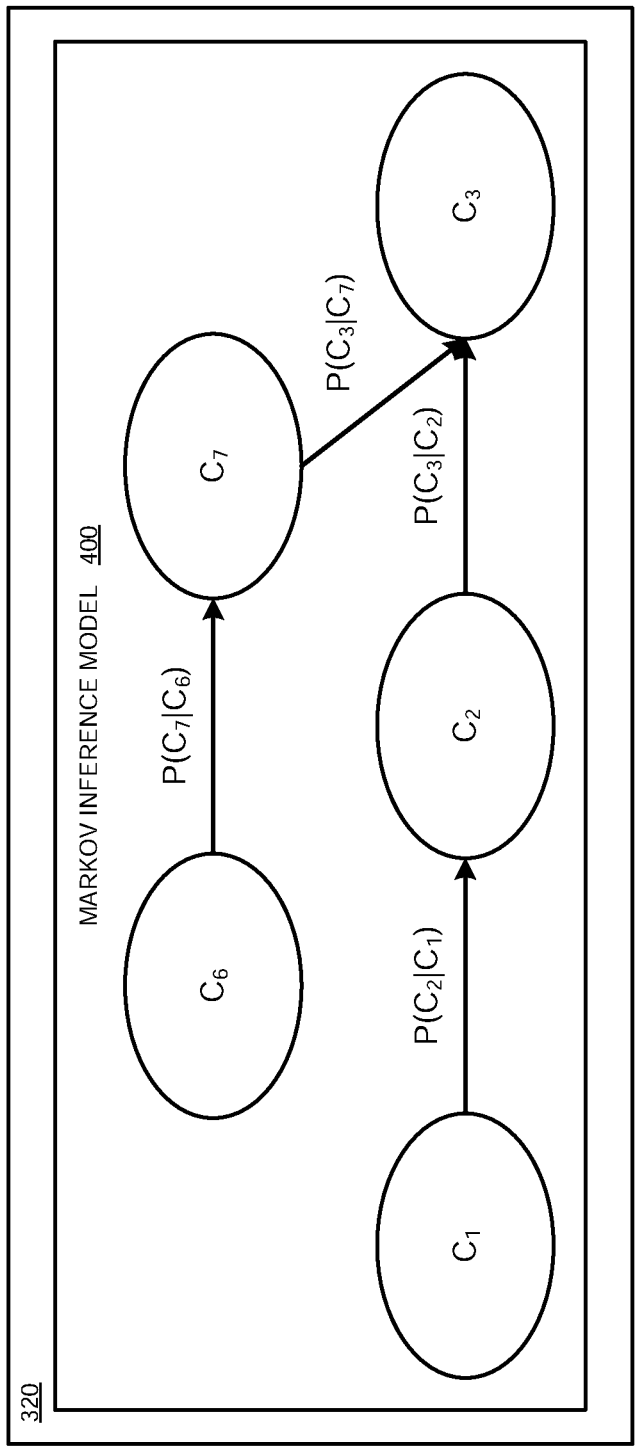
FIG. 4 depicts an inference model for use as part of an example configuration for identifying related messages in a natural language interaction in accordance with an illustrative embodiment.

With reference to FIG. 4, this figure depicts an inference model for use as part of an example configuration for identifying related messages in a natural language interaction in accordance with an illustrative embodiment. The model is part of related message class identification module 320 in FIG. 3.

In particular, FIG. 4 depicts Markov inference model 400, used to model conversation patterns. $C_1$, $C_2$, $C_3$, $C_6$, and $C_7$ represent message classes. Model 400 has already been trained, and conditional probabilities for moving from one message class to another have been determined. Thus, if a message is in class 1, denoted by $C_1$, there is a conditional probability $P(C_2|C)$ (i.e., the probability of $C_2$ given $C_1$) that this message in $C_1$ will be followed by another message in $C_2$. Similarly, there is a conditional probability $P(C_3|C_2)$ that a message in $C_2$ will be followed by a message in $C_3$. Note that $C_3$ can also be accessed from $C_7$, with the conditional probability $P(C_3|C_7)$.

Module 320 uses model 400 as a message class prediction model to determine a probability of a previous message class having resulted in a current message class. In mathematical notation, a probability of a previous message class having resulted in a current message class is the conditional probability $P(C_p|C_m)$, where a class of a message currently being analyzed is denoted by $C_m$, and a class of a parent message is denoted by $C_p$. For example, during training model 400 learned a probability $P(C_2|C_1)$ that a message in $C_1$ will be followed by a message in $C_2$. Thus, module 320 determines the reverse probability $P(C_1|C_2)$ (the probability that, if a current message is in $C_2$, that message's parent is in $C_1$) using any suitable mathematical technique.

Figure 5:
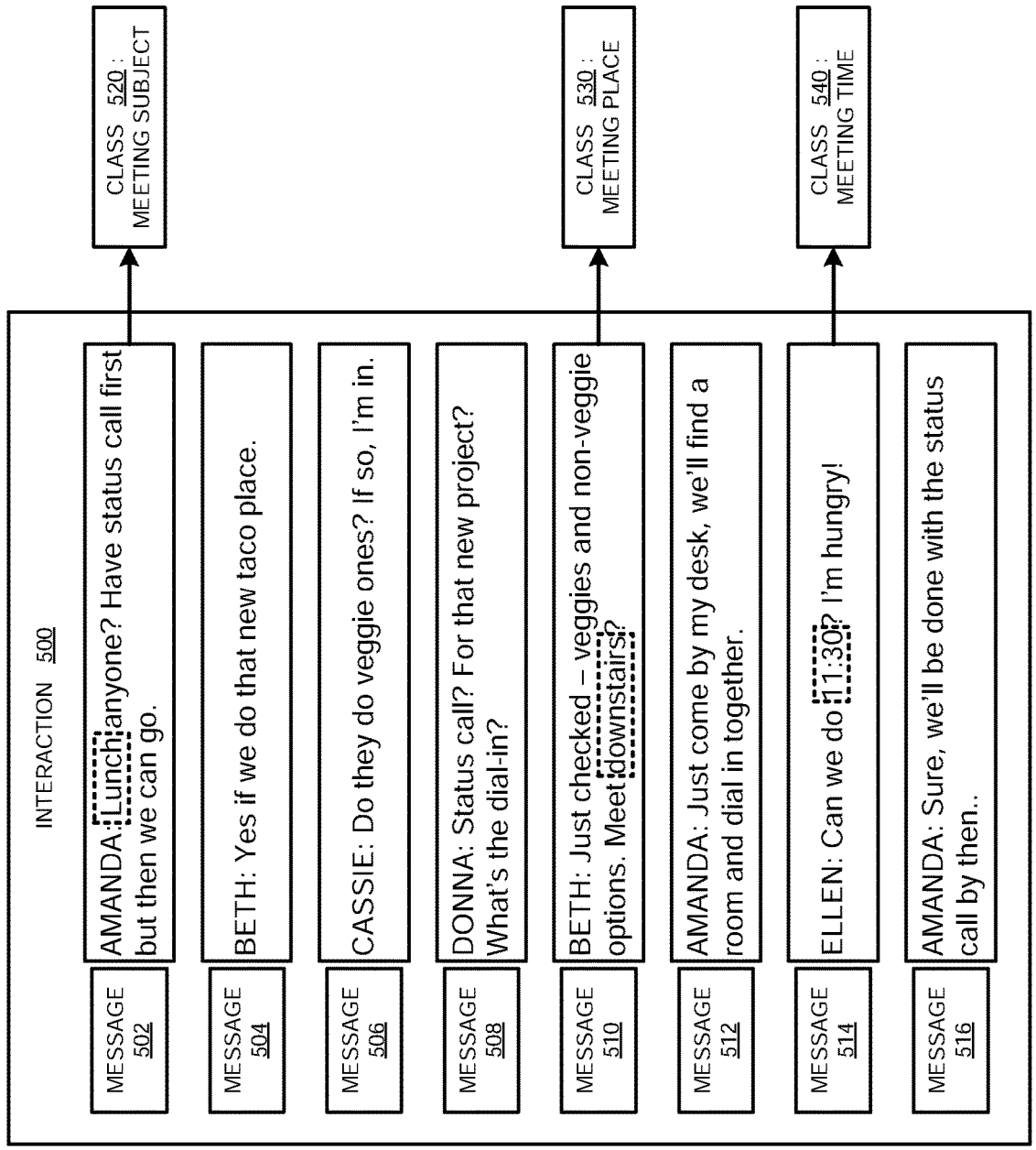
FIG. 5 depicts an example of identifying related messages in a natural language interaction in accordance with an illustrative embodiment.

With reference to FIG. 5, this figure depicts an example of identifying related messages in a natural language interaction in accordance with an illustrative embodiment. The example can be executed using application 300 in FIG. 3.

Interaction 500, including a plurality of participants, includes messages 502, 504, 506, 508, 510, 512, 514, and 516, sent to a group. As can be seen, most of the messages involve a discussion of lunch. However, interleaved within the lunch discussion are messages 508 and 512, which, as is typical of an interaction in a conversation-based collaboration tool, do not deal with lunch but another matter prompted by the lunch discussion.

As depicted, application 300 has classified message 502 into class 520, a meeting subject ("lunch"). Application 300 has classified message 510 into class 530, a meeting place ("downstairs"). Application 300 has classified message 514 into class 540, a meeting time ("11:30").

Figure 6:
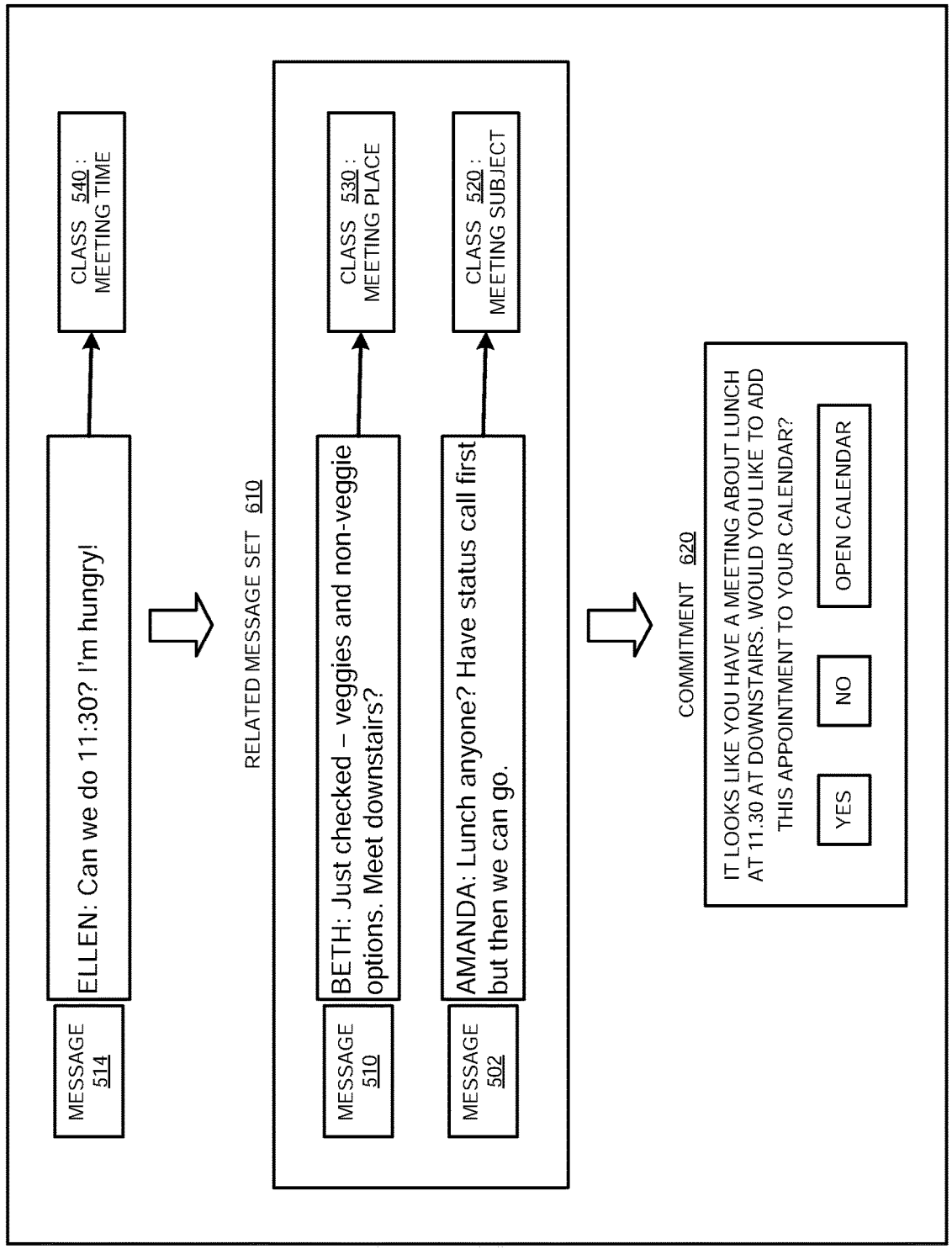
FIG. 6 depicts a continuing example of identifying related messages in a natural language interaction in accordance with an illustrative embodiment.

With reference to FIG. 6, this figure depicts a continuing example of identifying related messages in a natural language interaction in accordance with an illustrative embodiment. Messages 502, 510, and 514, and classes 520, 530, and 540 are the same as messages 502, 510, and 514, and classes 520, 530, and 540 in FIG. 5. The example can be executed using application 300 in FIG. 3.

As depicted, application 514 is the current message, and is in class 540, a class of messages dealing with a meeting time. Application 300 has determined that messages in class 520 (meeting subject) and class 530 (meeting place) have above a predetermined threshold probability of having resulted in a message in class 540. As a result, application 300 has used those probabilities to extract previous messages 510 and 502 from interaction 500, forming related message set 610. Both messages 510 and 502 are parent messages to message 514.

Once application 300 has identified related message set 610 and determined that information in message 514 and message set 610 includes data relating to a commitment, application 300 assembles the information into commitment 620. In particular, because message 514 and message set 610 include meeting information, commitment 620 assembles the information in the messages into a calendar item and offers to store the calendar item for a user.

Figure 7:
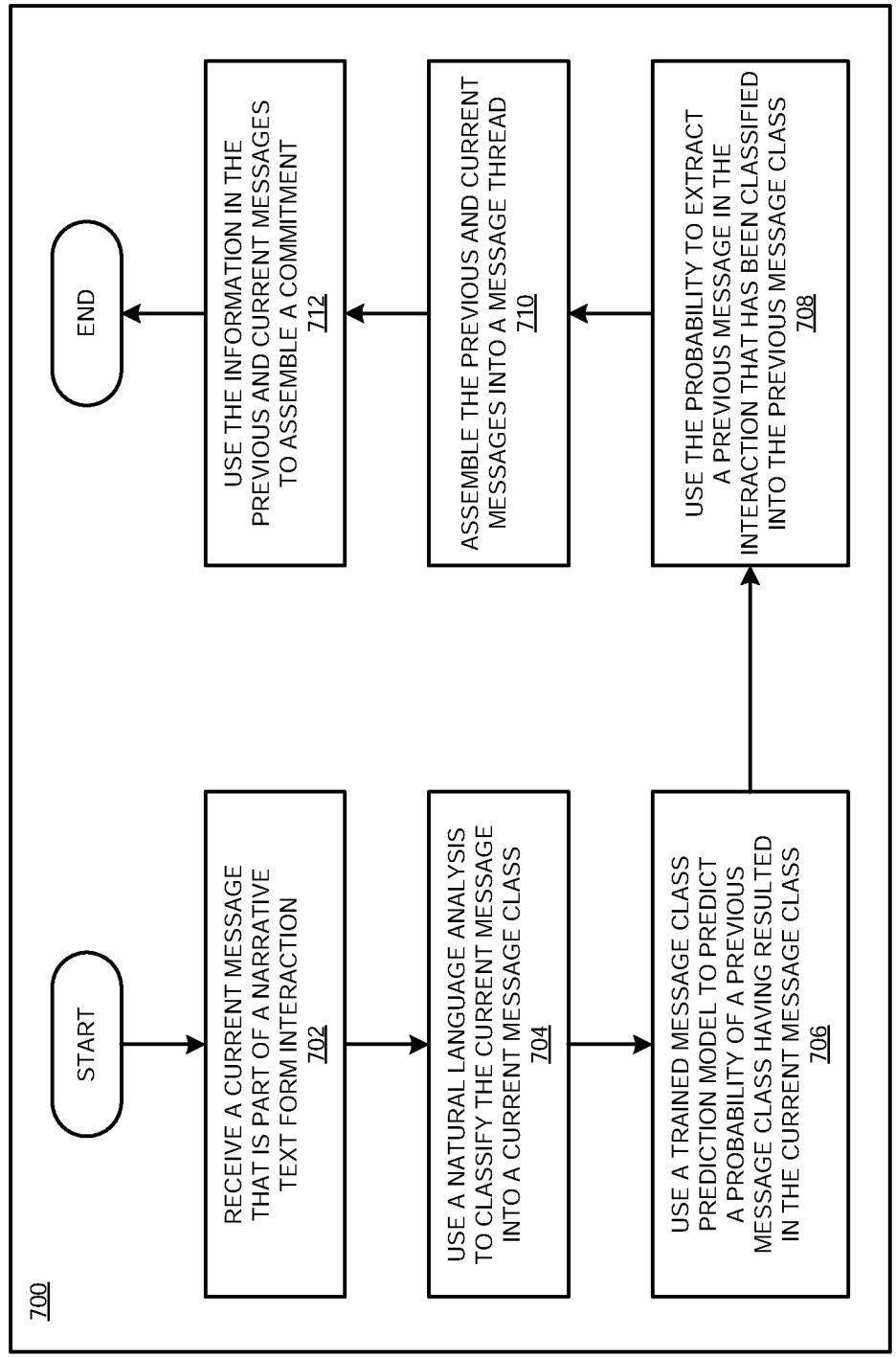
FIG. 7 depicts a flowchart of an example process for identifying related messages in a natural language interaction in accordance with an illustrative embodiment.

With reference to FIG. 7, this figure depicts a flowchart of an example process for identifying related messages in a natural language interaction in accordance with an illustrative embodiment. Process 700 can be implemented in application 300 in FIG. 3.

In block 702, the application receives a current message that is part of a narrative text form interaction. In block 704, the application uses a natural language analysis to classify the current message into a current message class. In block 706, the application uses a trained message class prediction model to predict a probability of a previous message class having resulted in the current message class. In block 708, the application uses the probability to extract a previous message in the interaction that has been classified into the previous message class. In block 710, the application assembles the previous and current messages into a message thread. In block 712, the application uses the information in the previous and current messages to assemble a commitment. Then the application ends.

Figure 8:
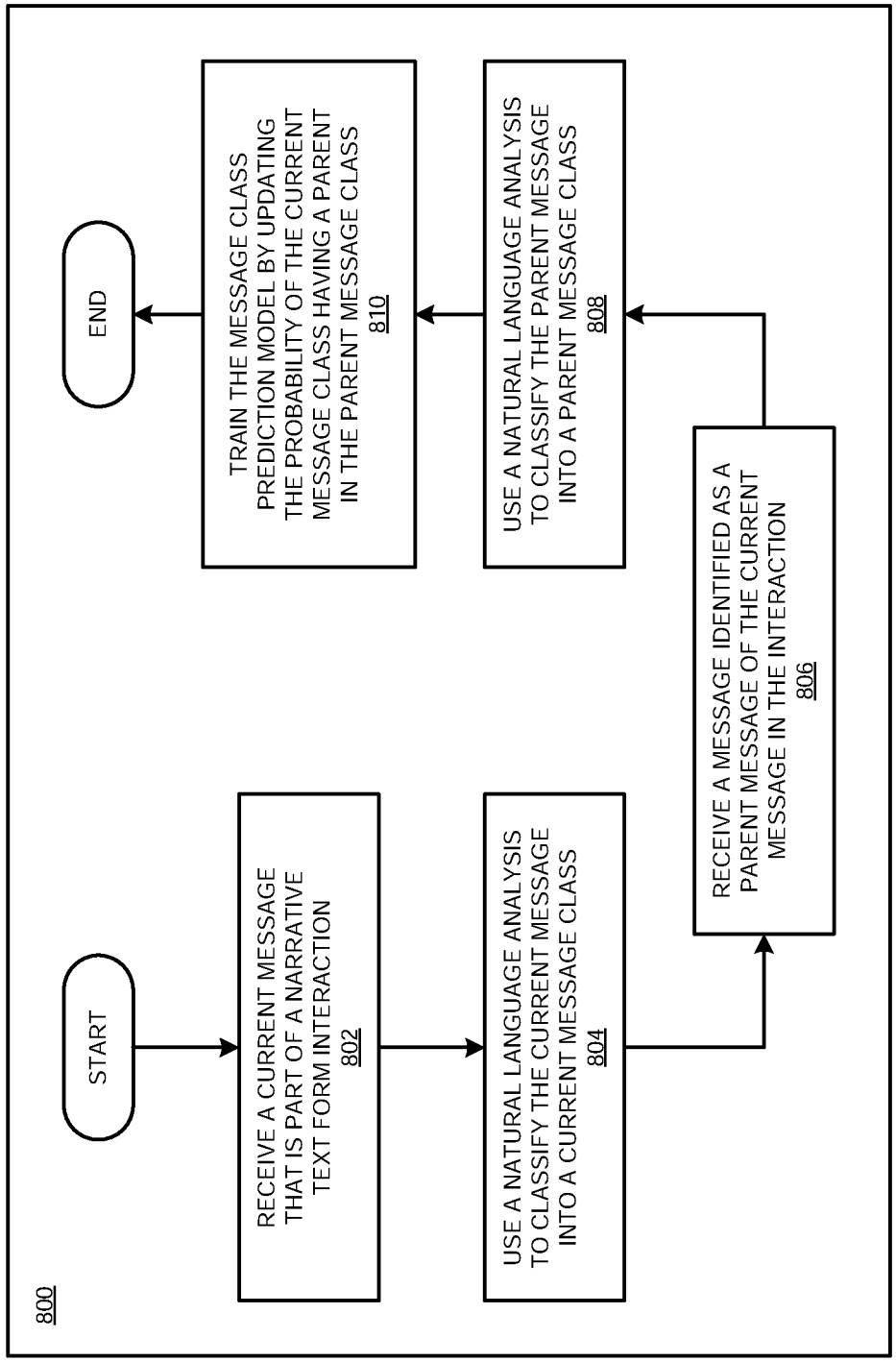
FIG. 8 depicts a flowchart of an example process for identifying related messages in a natural language interaction in accordance with an illustrative embodiment.

With reference to FIG. 8, this figure depicts a flowchart of an example process for identifying related messages in a natural language interaction in accordance with an illustrative embodiment. Process 800 can be implemented in application 300 in FIG. 3.

In block 802, the application receives a current message that is part of a narrative text form interaction. In block 804, the application uses a natural language analysis to classify the current message into a current message class. In block 806, the application receives a message identified as a parent message of the current message in the interaction. In block 808, the application uses a natural language analysis to classify the parent message into a parent message class. In block 810, the application trains a message class prediction model by updating the probability of the current message class given a parent in the parent message class according to (number of current message class instances)/(number of parent message class instances). Then the application ends.

With reference to FIG. 9, this figure depicts a flowchart of an example process for identifying related messages in a natural language interaction in accordance with an illustrative embodiment. Process 900 can be implemented in application 300 in FIG. 3.

In block 902, the application presents a current message that is part of a narrative text form interaction, and two possible parent messages, to the current message. In block 904, the application collects an annotation as to the relative ranking of the two possible parent messages. In block 906, the application encodes each message as a feature vector. In block 908, the application uses a machine learning technique and the annotated relative rankings to train a message ranking model to learn which of the possible parents is a better parent to the current message. Then the application ends.

Thus, a computer implemented method, system or apparatus, and computer program product are provided in the illustrative embodiments for identifying related messages in a natural language interaction and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    training a message class prediction model using a training set interaction in narrative text form, the training comprising configuring a Markov inference model to determine a plurality of conditional probabilities, each conditional probability comprising a probability of a message in a second message class following a message in a first message class, wherein the training results in a trained message class prediction model;
    classifying, using a natural language analysis, a current message into a current message class, the current message being a portion of an interaction in narrative text form;
    determining, using the trained message class prediction model and the current message class, a previous message class probability, the previous message class probability comprising a probability that the current message class was preceded by a message in a previous message class; and
    extracting, from the interaction using the previous message class probability, a previous message, the previous message being a portion of the interaction occurring prior to the current message, the previous message being classified into the previous message class.

2. The computer-implemented method of claim 1, further comprising:
    assembling, into a message thread, the previous message and the current message.

3. The computer-implemented method of claim 1, further comprising:
    assembling, into a commitment, information in the previous message and the current message.

4. The computer-implemented method of claim 1, further comprising:
    classifying, using the natural language analysis, a second current message into a second current message class, the second current message being a portion of a training set interaction in narrative text form;
    classifying, using the natural language analysis, a parent message into a parent message class, the parent message being a portion of a training set interaction in narrative text form, the parent message comprising a previous message in the training set interaction relating to the second current message in the training set interaction; and
    updating, to train the message class prediction model, a conditional probability of the current message class given a parent in the parent message class.

5. The computer-implemented method of claim 1, further comprising:
    determining, using the trained message class prediction model, a second previous message class probability, the second previous message class probability comprising a probability that the current message class was preceded by a message in a second previous message class; and
    extracting, from the interaction using the second previous message class probability, a second previous message, the second previous message being a portion of the interaction occurring prior to the current message, the second previous message being classified into the second previous message class.

6. The computer-implemented method of claim 5, further comprising:
    ranking, according to the previous message class probability and the second previous message class probability, the previous message and the second previous message.

7. The computer-implemented method of claim 5, further comprising:
    ranking, responsive to the previous message class probability and the second previous message class probability being above a threshold probability according to a timestamp associated with the previous message and a second timestamp associated with the second previous message, the previous message and the second previous message.

8. The computer-implemented method of claim 5, further comprising:
    encoding, into a first vector representation, the previous message;
    encoding, into a second vector representation, the second previous message;
    encoding, into a third vector representation, the current message; and
    ranking, using a trained message ranking model operating on the first vector representation, the second vector representation, and the third vector representation, the previous message and the second previous message.

9. The computer-implemented method of claim 8, further comprising:
    encoding, into a fourth vector representation, a second current message, the second current message being a portion of a training set interaction in narrative text form;
    encoding, into a fifth vector representation, a first candidate parent message, the first candidate parent message being a portion of a training set interaction in narrative text form, the candidate parent message comprising a previous message in the training set interaction;
    encoding, into a sixth vector representation, a second candidate parent message, the second candidate parent message being a portion of the training set interaction in narrative text form, the second parent message comprising a second previous message in the training set interaction; and training, according to a relative relevance comparing a first relevance of the first candidate parent message to the second current message with a second relevance of the second candidate parent message to the second current message, the message ranking model.

10. The computer-implemented method of claim 5, further comprising:
   encoding, into a first vector representation, the previous message;
   encoding, into a second vector representation, the second previous message;
   encoding, into a third vector representation, the current message; and
   ranking, using a trained message ranking model operating on the first vector representation, the second vector representation, and the third vector representation responsive to the probability and the second probability being above a threshold probability, the previous message and the second previous message.

11. A computer usable program product comprising one or more computer-readable storage devices, and program instructions stored on at least one of the one or more storage devices, the stored program instructions comprising:
   program instructions to train a message class prediction model using a training set interaction in narrative text form, the training comprising configuring a Markov inference model to determine a plurality of conditional probabilities, each conditional probability comprising a probability of a message in a second message class following a message in a first message class, wherein the training results in a trained message class prediction model;
   program instructions to classify, using a natural language analysis, a current message into a current message class, the current message being a portion of an interaction in narrative text form;
   program instructions to determine, using the trained message class prediction model and the current message class, a previous message class probability, the previous message class probability comprising a probability that the current message class was preceded by a message in a previous message class; and
   program instructions to extract, from the interaction using the previous message class probability, a previous message, the previous message being a portion of the interaction occurring prior to the current message, the previous message being classified into the previous message class.

12. The computer usable program product of claim 11, further comprising:
   program instructions to assemble, into a message thread, the previous message and the current message.

13. The computer usable program product of claim 11, further comprising:
   program instructions to assemble, into a commitment, information in the previous message and the current message.

14. The computer usable program product of claim 11, further comprising:
   program instructions to classify, using the natural language analysis, a second current message into a second current message class, the second current message being a portion of a training set interaction in narrative text form;
   program instructions to classify, using the natural language analysis, a parent message into a parent message class, the parent message being a portion of a training set interaction in narrative text form, the parent message comprising a previous message in the training set interaction relating to the second current message in the training set interaction; and
   program instructions to update, to train the message class prediction model, a conditional probability of the current message class given a parent in the parent message class.

15. The computer usable program product of claim 11, further comprising:
   program instructions to determine, using the trained message class prediction model, a second previous message class probability, the second previous message class probability comprising a probability that the current message class was preceded by a message in a second previous message class; and
   program instructions to extract, from the interaction using the second previous message class probability, a second previous message, the second previous message being a portion of the interaction occurring prior to the current message, the second previous message being classified into the second previous message class.

16. The computer usable program product of claim 15, further comprising:
   program instructions to rank, according to the previous message class probability and the second previous message class probability, the previous message and the second previous message.

17. The computer usable program product of claim 15, further comprising:
   program instructions to rank, responsive to the previous message class probability and the second previous message class probability being above a threshold probability according to a timestamp associated with the previous message and a second timestamp associated with the second previous message, the previous message and the second previous message.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to train a message class prediction model using a training set interaction in narrative text form, the training comprising configuring a Markov inference model to determine a plurality of conditional probabilities, each conditional probability comprising a probability of a message in a second message class following a message in a first message class, wherein the training results in a trained message class prediction model;
   program instructions to classify, using a natural language analysis, a current message into a current message class, the current message being a portion of an interaction in narrative text form;

program instructions to determine, using the trained message class prediction model and the current message class, a previous message class probability, the previous message class probability comprising a probability that the current message class was preceded by a message in a previous message class; and program instructions to extract, from the interaction using the previous message class probability, a previous message, the previous message being a portion of the interaction occurring prior to the current message, the previous message being classified into the previous message class.

* * * * *